(12) United States Patent
Trares et al.

(10) Patent No.: US 8,215,356 B2
(45) Date of Patent: Jul. 10, 2012

(54) TIRE WITH COMPOSITE PLY STRUCTURE AND ENVELOPE TURNUP

(75) Inventors: Keith Carl Trares, Akron, OH (US); Joseph Kevin Hubbell, Akron, OH (US); Robert Allen Losey, Kent, OH (US); Robert Anthony Neubauer, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1029 days.

(21) Appl. No.: 11/825,876

(22) Filed: Jul. 10, 2007

(65) Prior Publication Data

US 2008/0149250 A1 Jun. 26, 2008

Related U.S. Application Data

(60) Provisional application No. 60/876,329, filed on Dec. 21, 2006.

(51) Int. Cl.
*B60C 9/02* (2006.01)
(52) U.S. Cl. ........ 152/551; 152/550; 152/553; 152/554; 152/555
(58) Field of Classification Search .......... 152/550–554, 152/548, 560, 555
See application file for complete search history.

(56) References Cited

U.S. PATENT DOCUMENTS

| 3,451,461 A | 6/1969 | Wittneben | 152/356 |
| 6,709,540 B1 * | 3/2004 | Oare et al. | 156/133 |
| 6,913,052 B2 | 7/2005 | Losey | 152/551 |
| 7,509,987 B2 * | 3/2009 | Downing et al. | 152/539 |
| 2004/0123928 A1 * | 7/2004 | Losey | 152/454 |
| 2004/0123937 A1 * | 7/2004 | Losey | 156/132 |

FOREIGN PATENT DOCUMENTS

| DE | 19537395 A1 * | 4/1997 |
| EP | 1 433 590 A2 | 6/1969 |
| JP | 2005-081873 A * | 3/2005 |

OTHER PUBLICATIONS

European Search Report, completed Mar. 18, 2008.
Patent Abstracts of Japan, Publication No. 2001 191722 A dated Jul. 17, 2001.

* cited by examiner

*Primary Examiner* — Geoffrey L Knable
(74) *Attorney, Agent, or Firm* — June E. Rickey

(57) ABSTRACT

A tire and method of building a tire is described wherein the tire has a carcass having a pair of sidewall plies and a bridge ply, each ply being reinforced with cords, the sidewall plies each having a first end which is received between the bridge ply and a belt reinforcing structure; wherein each sidewall ply extends axially outward along the sidewall and extending radially inwardly to the bead core and folded from a position axially outside the bead core to a position axially inside and around the bead core to an axially inner turnup end; said bridge ply having ends which overlap with a respective inner turnup end of said sidewall ply.

6 Claims, 4 Drawing Sheets

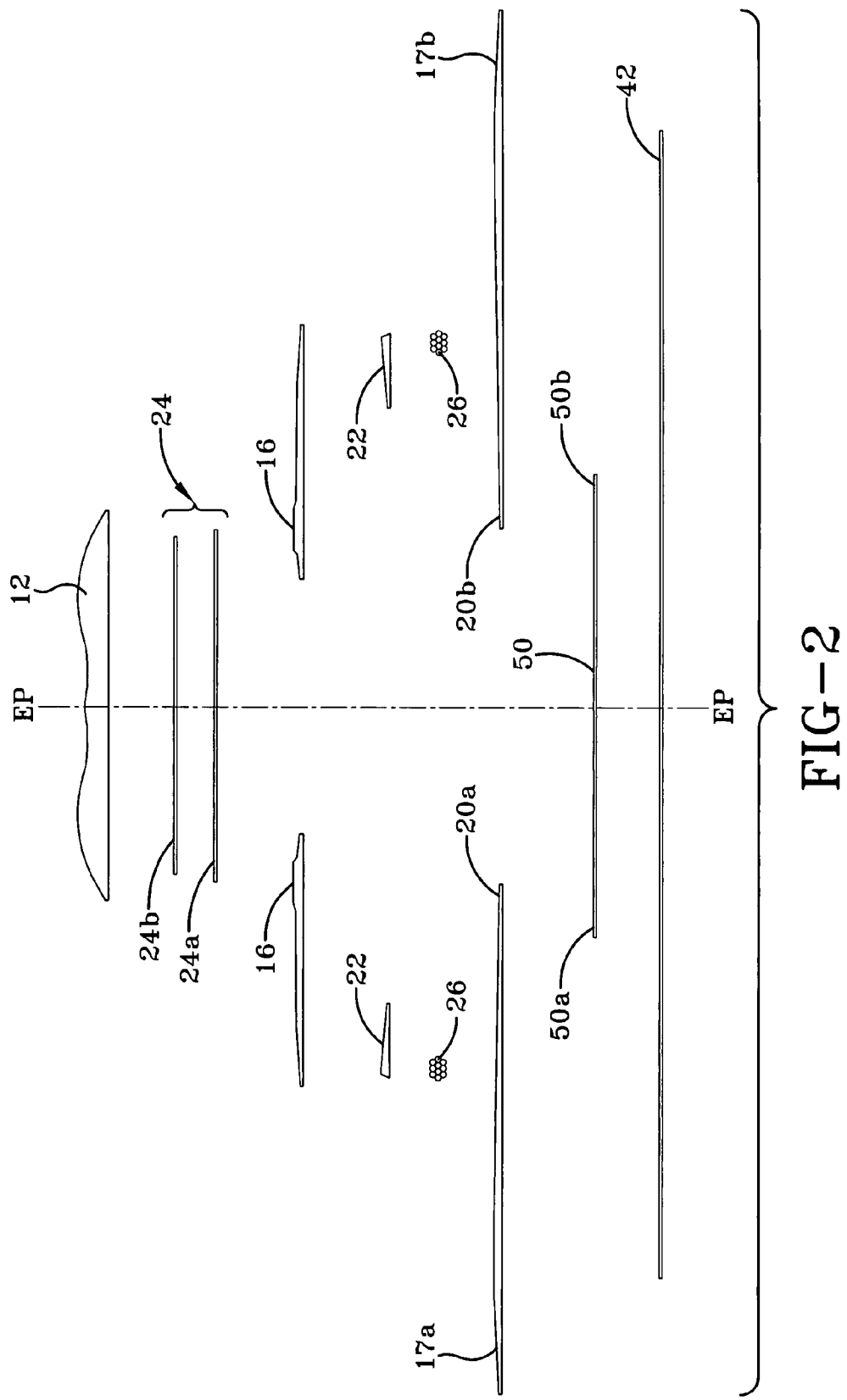

TIRE WITH COMPOSITE PLY STRUCTURE AND ENVELOPE TURNUP

This application claims the benefit of, and incorporates by reference, U.S. Provisional Application No. 60/876,329 filed Dec. 21, 2006.

BACKGROUND OF THE INVENTION

It is known in the prior art to utilize an "outside-in" configuration wherein the ply is wrapped around the bead so that the turn up end is located on the inside of the tire or inside the apex. The reversing of the location of the ply turnup results in the reversing of the direction of the force on the ply (not shown), torquing the toe into the rim. Further, this reversed torquing action utilizes the material in the bead more efficiently allowing the bead size to be proportionately reduced. Other associated components can then also be reduced. Even a small decrease in the amount of materials needed to produce a tire can result in significantly decreased material expenses for a manufacturer engaged in high-volume tire production. There is a need for a tire having reduced weight that provides the desired performance characteristics and can be produced with fewer materials at a lower cost.

The present invention provides a novel way of creating such a ply structure in a tire and another novel radial ply pneumatic tire made by this method.

SUMMARY OF THE INVENTION

The invention provides in a first aspect a method of building a tire having a carcass assembly having a pair of bead cores and a radial ply reinforcing structure; the method comprises the steps of: applying an innerliner; applying a bridge ply over said innerliner; cylindrically applying a pair of radial cord reinforced sidewall plies, wherein the sidewall plies are spaced apart in the crown area of the tire; wherein bridge ply overlaps the ends of the sidewall plies; setting one bead core over each sidewall ply; turning up each sidewall ply forming a turned up end, wherein the turned up end of each sidewall ply overlaps with the end of the bridge ply; moving the carcass assembly axially inwardly while shaping the carcass assembly toroidally to form ply turnups axially inwardly of the bead cores.

The invention provides in a second aspect a pneumatic radial ply tread tire comprising: a pair of axially-spaced bead cores; a carcass having a pair of sidewall plies and a bridge ply, each ply being reinforced with parallel radially extending cords, the sidewall plies each having a first end which is received between the bridge ply and a belt reinforcing structure; wherein each sidewall ply extends axially outward along the sidewall and extending radially inwardly to the bead core and folded from a position axially outside the bead core to a position axially inside and around the bead core to an axially inner turnup end; said bridge ply having ends which overlap with a respective inner turnup end of said sidewall ply and a tread.

DEFINITIONS

"Aspect Ratio" means the ratio of its section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including the beads.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Pneumatic tire" means a laminated mechanical device of generally toroidal shape (usually an open-torus) having bead cores and a tread and made of rubber, chemicals, fabric and steel or other materials. When mounted on the wheel of a motor vehicle, the tire through its tread provides traction and contains the fluid that sustains the vehicle load.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that component which comprises a portion of the outside surface of a tire between the tread and the be "Shoulder" means the upper portion of sidewall just below the tread edge.

"Sidewall" means that portion of a tire between the tread and the bead.

"Tire industry standard size" refers to the series of letters and numbers used by tire manufacturers to define a tire's characteristics. The series includes such factors as tire width, aspect ratio (height to width), radial/bias type, rim diameter, speed rating, and load rating.

"Tread" means a molded rubber component which, when bonded to a tire casing, includes that portion of the tire that comes into contact with the road when the tire is normally inflated and under normal load.

"Tread Width or Tread Arc Width" means the arc length of the road-contacting tread surface in the axial direction, that is, in a plane parallel to the axis of rotation of the tire.

BRIEF DESCRIPTION OF THE DRAWINGS

The invention will be described by way of example and with reference to the accompanying drawings in which:

FIG. 2 is an exploded view of the tire components prior to application to the tire building drum;

DETAILED DESCRIPTION OF THE INVENTION

Figure 1:
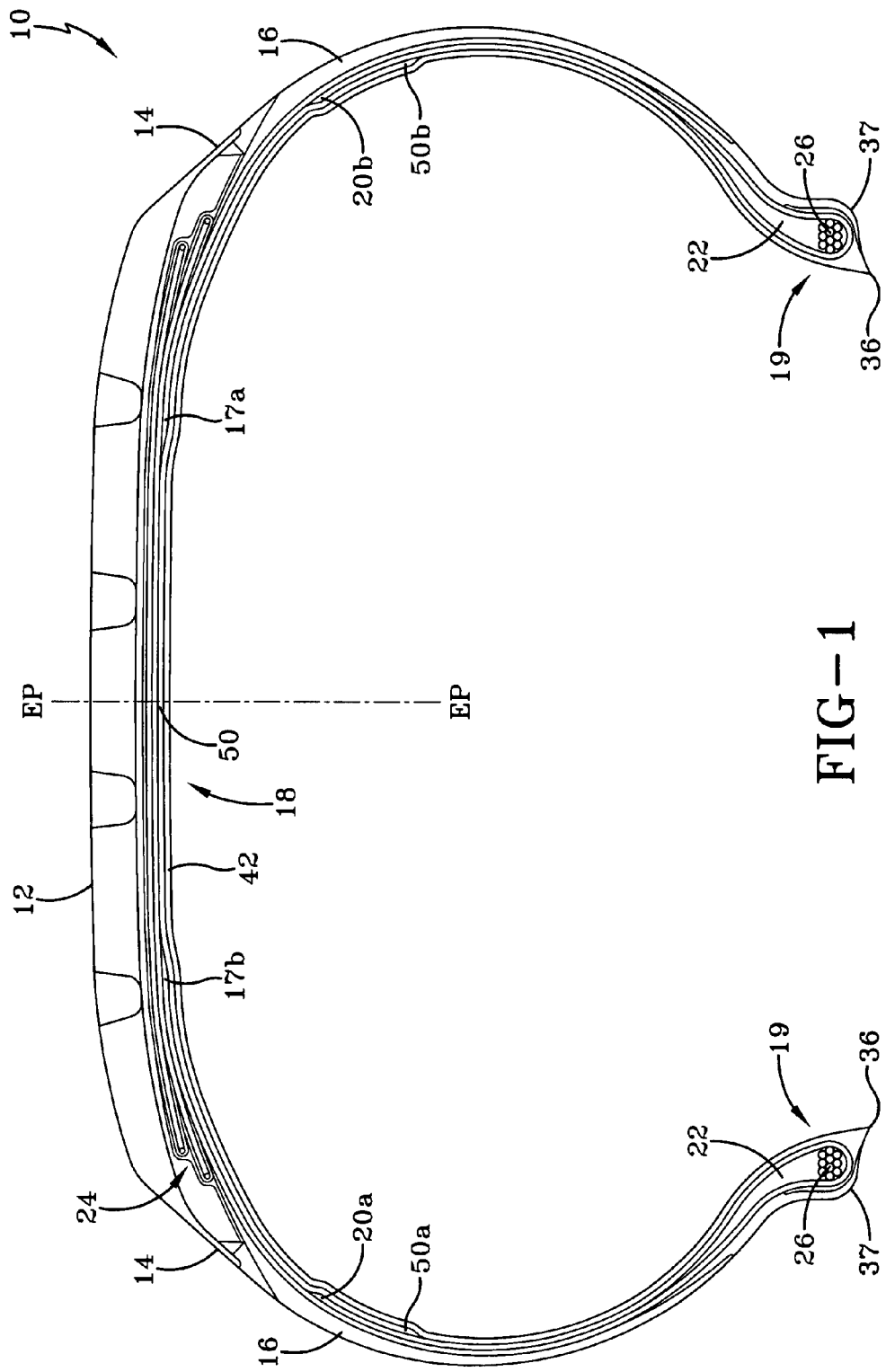
FIG. 1 is a cross-sectional view of the tire according to the invention and FIG. 1A is an enlarged view of half the tire of FIG. 1.
Figure 1A:
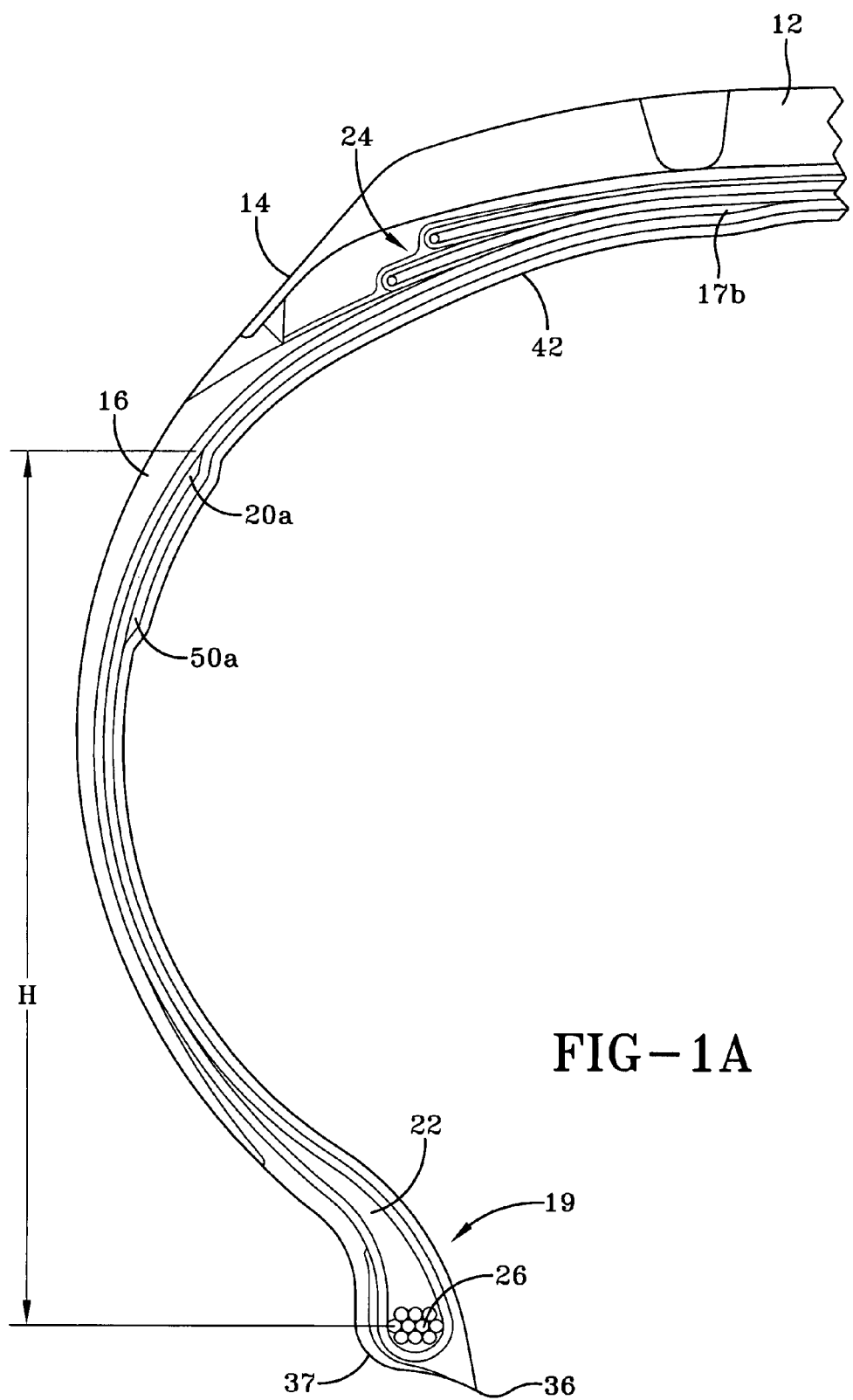
Figure 3A:
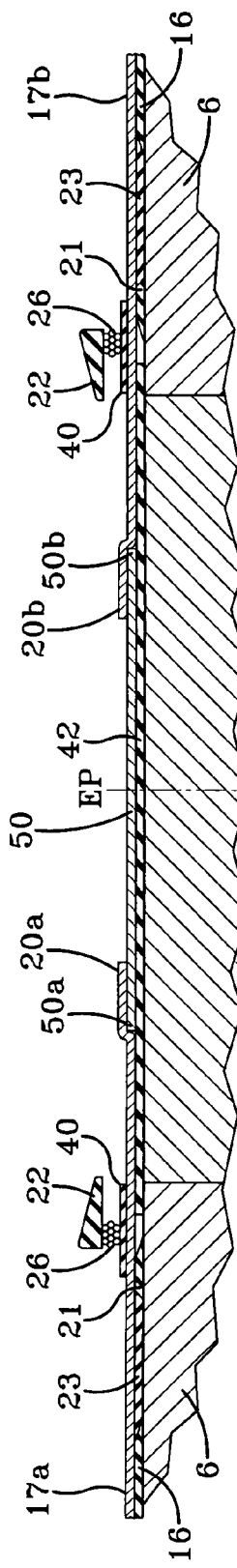
FIGS. 3A, 3B and 3C are schematic views of the tire carcass of FIG. 1 being made according to the method of the present invention.
Figure 3B:
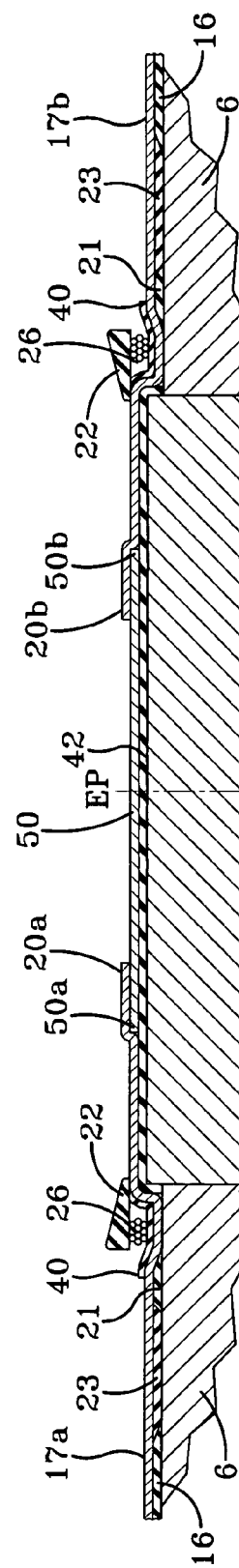
Figure 3C:
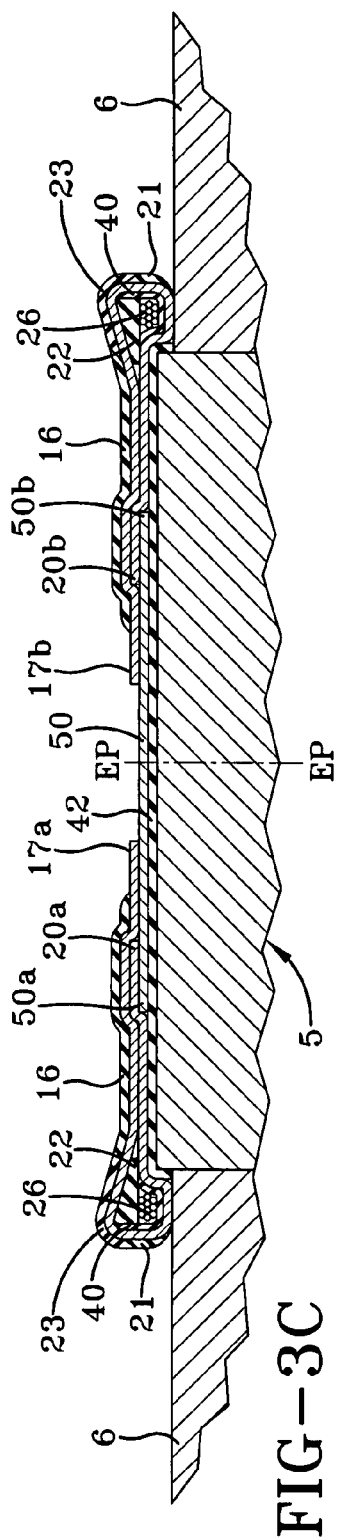

FIG. 1 shows a cross-sectional view of the general construction of a tire 10 according to the present invention. The tire 10 of the present invention may be a passenger tire, a radial light truck tire, or radial commercial truck tire. The tire 10 has a tread portion 12 and a pair of sidewalls 16 wherein the sidewalls 16 are connected to the tread portion 12 in the shoulder regions 14. The tire 10 may have one or more reinforcing belts 24 which laterally extend under the tread. The tire 10 includes an additional bridge ply 50 that is located below the belts 24 and spans the gap under the crown portion between the split sidewall plies 17a and 17b. The location of the bridge ply 50 may vary.

A carcass 18 of the tire includes tires an air impervious innerliner 42 which extends from bead to bead along the innermost portion of the tire. The liner 42 may comprise halobutyl rubber by way of example.

The carcass further comprises a single layer of ply 17 which is split into two sidewall plys 17a, 17b and does not have a center crown portion. The split plys 17a, 17b have a first end 17a, 17b which is located between the tread belt 24 and the bridge ply 50. The split plies 17a, 17b extend down the sidewall of the tire and wrap around the bead 26 and apex 22 from the outside of the tire to the inside, i.e., a reverse turnup. The split plys terminate in a turn-up end 20a, 20b located in the sidewall of the tire. The ends 20a, 20b extend radially outward from the bead center a distance H wherein H ranges from about 1.5 inches to about 9 inches depending upon tire size. Preferably, the ends 20a, 20b overlap with ends 50a, 50b of bridge ply 50. The amount of overlap ranges from about 0.1 to about 6 inches, more preferably about 1 to about 5 inches. Because the sidewall ply overlaps with the bridge ply there is effectively two layers of ply in the sidewall area of the tire to provide extra protection against sidewall damage and improve overall durability.

The method of manufacturing the present invention permits the tire to be fabricated on a flat build cylindrically shaped building drum 5 as illustrated in FIGS. 2, and 3A, 3B, and 3C.

As shown in FIG. 2, an optional liner layer 42 may first be applied to a tire building drum 5. A pair of rubber sidewall strips 16 is placed on the drum axially outward of the inner liner 42. A bridge ply 50 is applied to the building drum 5 and centrally positioned in the centerline as shown over the inner liner.

A pair of sidewall ply layers 17a, 17b are applied onto the building drum over the sidewalls 16 with the axially inner turnup ends 20a, 20b abutting respective ends 50a, 50b of the bridge ply 50. More preferably, the turnup ends 20a, 20b are applied over the bridge ply such that the turnup ends 20a, 20b overlap bridge ply ends 50a, 50b in the range of about 1 to about 5 inches. Although not shown, the bridge ply 50 may be placed before or after the pair of sidewall plies 17a, 17b.

An optional pair of flippers 40 can be located in an area approximated at the location of the bead cores 26 if so desired.

The bead cores 26 are then passed over the building drum 5 over the cylindrically formed components and placed on the drum 5 at a predetermined spacing L between the bead cores. Preferably the bead cores are locked into position on the building drum.

At each end of the building drum 5 is a means 6 for turning up and folding over the sidewall plies 17a, 17b. When the means 6 is activated the sidewall plies 17a, 17b are folded overlapping lateral edge portions 50a and 50b of the bridge ply 50 on each side. The assembly can then be stitched securing the carcass assembly 18.

The carcass assembly 18 may optionally include a pair of chafer strips 21 applied in an area directly below the beads as an initially applied component.

Once all the carcass components are assembled, the carcass assembly 18 can be toroidally shaped by moving the beads 26 and carcass components axially inwardly as the assembly is expanded radially to a toroidal shape.

A first belt layer 24a is then applied to the carcass covering the bridge ply 50 and the overlapping portions of the sidewall plies 17a, 17b. This overlapping belt layer 24a provides additional structure to hold the assembly together. The belt layer has a width $W_{B1}$, as shown. A second narrower in width belt layer 24b having cords inclined opposite the first layer 24a can then be applied. That second belt layer has a width $W_{B2}$ If the first belt layer has cords oriented at about 0° then a second and third belt layers 24b and 24c may be employed as an alternative construction.

The resultant method yields a tire as illustrated in FIG. 1 wherein ends of split plies 17a and 17b are sandwiched between the bridge ply 50 and the first belt layer 24a. The bridge ply bridges the gap between ply ends 17a, 17b to reinforce the crown portion of the tire and preferably extends down the shoulder to abut or overlap with turnup ends 20a, 20b.

This construction creates a very strong mechanical structure in the crown area of the tire and insures the ends of plies 17a and 17b are moved well inboard of the highly flexed tread shoulders 14 and directly inward of the crown portion of the tread 12 and belt reinforcing structure 24. The shoulder portions of the tire are reinforced with two effective layers of ply formed from the split plies and the bridge ply.

What is claimed is:

1. A pneumatic radial ply tire comprising:
   a pair of axially-spaced bead cores;
   a carcass having a pair of sidewall plies and a bridge ply, said bridge ply having first and second outer ends which do not wrap around the bead cores and which terminate in the sidewall portion of the tire, each ply being reinforced with cords, the sidewall plies each having a first end which is received between the bridge ply and a belt reinforcing structure;
   wherein each sidewall ply extends axially outward along the sidewall and extending radially inwardly to the bead core and folded from a position axially outside the bead core to a position axially inside and around the bead core forming first and second axially inner turnup ends which terminate in the sidewall portion of the tire;

said first and second outer ends of said bridge ply overlapping with said first and second axially inner turnup ends of said sidewall plies.

2. The pneumatic radial ply tire of claim 1 wherein the sidewall plies are reinforced with steel cords.

3. The pneumatic radial ply tire of claim 1 wherein the bridge ply is reinforced with substantially inextensible cords made of steel or aramid.

4. The pneumatic radial ply tire of claim 1 wherein the first and second outer ends of the bridge ply overlap with a respective first and second axially inner turnup ends of the sidewall ply in the range of about 0.1 to 6 inches.

5. The pneumatic radial ply tire of claim 1 wherein the first and second outer ends of the bridge ply overlap with a respective first and second axially inner turnup ends of the sidewall ply in the range of about 1 to 5 inches.

6. The pneumatic radial ply tire of claim 1 wherein the bridge ply is radially inward of the sidewall plies.

* * * * *